(12) United States Patent
Frossen et al.

(10) Patent No.: US 8,614,560 B2
(45) Date of Patent: Dec. 24, 2013

(54) METHOD AND APPARATUS FOR DETERMINING INTERACTION MODE

(75) Inventors: Johan Frossen, Helsinki (FI); Phillip Lindberg, Helsinki (FI)

(73) Assignee: Nokia Corporation, Espoo (FI)

( * ) Notice: Subject to any disclaimer, the term of this patent is extended or adjusted under 35 U.S.C. 154(b) by 485 days.

(21) Appl. No.: 12/748,015

(22) Filed: Mar. 26, 2010

(65) Prior Publication Data

US 2011/0234152 A1    Sep. 29, 2011

(51) Int. Cl.
*H02J 7/00*    (2006.01)

(52) U.S. Cl.
USPC ........................................ 320/107

(58) Field of Classification Search
None
See application file for complete search history.

(56) References Cited

U.S. PATENT DOCUMENTS

| | | | |
|---|---|---|---|
| 7,414,380 B2 | 8/2008 | Tang et al. | |
| 2004/0098571 A1* | 5/2004 | Falcon | 713/1 |
| 2006/0028176 A1 | 2/2006 | Tang | |
| 2008/0211458 A1* | 9/2008 | Lawther et al. | 320/132 |
| 2010/0081473 A1* | 4/2010 | Chatterjee et al. | 455/559 |

FOREIGN PATENT DOCUMENTS

| | | |
|---|---|---|
| EP | 1622345 A1 | 2/2006 |
| JP | 7039078 A2 | 2/1995 |
| KR | 20020089637 A | 11/2002 |
| KR | 20050018514 A | 2/2005 |
| WO | 2006033736 A1 | 3/2006 |
| WO | 2006136195 A1 | 12/2006 |
| WO | 2008125072 A1 | 10/2008 |
| WO | 2008133806 A1 | 11/2008 |
| WO | 2008137996 A1 | 11/2008 |
| WO | 2009065419 A1 | 5/2009 |

OTHER PUBLICATIONS

Power line communication, available at http://en.wikipedia.org/wiki/Power_line_communication on Nov. 11, 2009.*
International Search Report and Written Opinion in corresponding Patent Cooperation Treaty Application No. PCT/IB2011/051245, Jul. 4, 2011, 10 pages.

* cited by examiner

*Primary Examiner* — Melissa Koval
*Assistant Examiner* — Daniel Miller
(74) *Attorney, Agent, or Firm* — McClure and Associates, PLLC

(57) ABSTRACT

An apparatus, comprising a processor, memory including computer program code, the memory and the computer program code configured to, working with the processor, cause the apparatus to perform at least the following: operating in a first interaction mode, receiving, from a charger, charger attribute information, determining a second interaction mode based, at least in part on the charger attribute information, the second interaction mode differing from the first interaction mode, terminating operation of the first interaction mode, and operating in the second interaction mode is disclosed.

24 Claims, 5 Drawing Sheets

METHOD AND APPARATUS FOR DETERMINING INTERACTION MODE

TECHNICAL FIELD

The present application relates generally to an electronic apparatus.

BACKGROUND

There has been a recent surge in the use of electronic devices. Many of these electronic devices have rechargeable batteries. Many users have more than one charger that they use for charging their electronic device.

SUMMARY

Various aspects of examples of the invention are set out in the claims.

An apparatus, comprising a processor, memory including computer program code, the memory and the computer program code configured to, working with the processor, cause the apparatus to perform at least the following: operating in a first interaction mode, receiving, from a charger, charger attribute information, determining a second interaction mode based, at least in part on the charger attribute information, the second interaction mode differing from the first interaction mode, terminating operation of the first interaction mode, and operating in the second interaction mode is disclosed.

A method comprising operating in a first interaction mode, receiving, from a charger, charger attribute information, determining a second interaction mode based, at least in part on the charger attribute information, the second interaction mode differing from the first interaction mode, terminating operation of the first interaction mode, and operating in the second interaction mode is disclosed.

A computer-readable medium encoded with instructions that, when executed by a computer, perform: operating in a first interaction mode, receiving, from a charger, charger attribute information, determining a second interaction mode based, at least in part on the charger attribute information, the second interaction mode differing from the first interaction mode, terminating operation of the first interaction mode, and operating in the second interaction mode is disclosed.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1A:
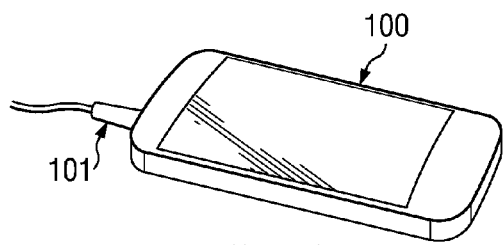
FIGS. 1A-1D are diagrams illustrating a charger in relation to an apparatus according to at least one example embodiment.

An embodiment of the invention and its potential advantages are understood by referring to FIGS. 1A through 6 of the drawings.

Many users have an apparatus, such as an electronic apparatus, with them while conducting various activities. As the user conducts his activities, he may be able to interact more easily with his apparatus if it is capable of modifying its interaction in conjunction with an activity the user is performing. Such activities may be unrelated to the use of the apparatus, but the activity may change the way the user wants to interact with the apparatus. For example, a user may want to interact differently with his apparatus depending on whether he is sleeping, driving, working at a desk, physically training, or relaxing.

Many users have multiple chargers that they use for charging their apparatus. The apparatus may utilize the charger as a means to determine how to interact with the user.

For example, an apparatus may detect that it is connected to a nightstand charger. In such a scenario, the apparatus may interact with the user based, at least in part, on a nightstand interaction mode. For example, a nightstand interaction mode may relate to a clock interaction mode, similar as described with reference to FIG. 2B. Furthermore, the nightstand interaction mode may involve forwarding calls to voicemail, updating social networking information to reflect resting and/or unavailability, disabling alerts, and/or the like. Nightstand interaction mode may be based, at least in part on orientation of the apparatus. For example, landscape orientation may relate to the clock interaction mode, and portrait orientation may relate to a phone interaction mode.

In another example, an apparatus may detect that it is connected to a car dashboard charger. In such a scenario, the apparatus may interact with the user based, at least in part, on a car interaction mode. For example, the apparatus may enable voice recognition, disable text messaging, and/or the like. The car interaction mode may be further based, at least in part, on orientation of the apparatus. For example, if the apparatus is oriented horizontally, the apparatus may interact with the user based, at least in part, on a map interaction mode, similar as described with reference to FIG. 2C, a phone interaction mode, and/or the liken. In another example, if the apparatus is oriented vertically, the apparatus may interact with the user based, at least in part, on a media player interaction mode, similar as described with reference to FIG. 2A, a phone interaction mode, and/or the like.

Without limiting the claims in any way, at least some technical effects of determining interaction mode based, at least in part, on the charger may be reducing and/or eliminating user input associated with changing interaction mode, providing the user with a simple way to change interaction mode, reducing the amount of attention a user dedicates to the apparatus for changing interaction mode, and/or the like. A further technical effect may be to provide the user with a simple way to interact with the apparatus.

FIGS. 1A-1D are diagrams illustrating a charger in relation to an apparatus according to at least one example embodiment. The examples of FIGS. 1A-1D are merely examples of a charger in relation to an apparatus, and do not limit the scope of the claims. For example, connection between the charger and the apparatus may vary, orientation of the charger may vary, orientation of the apparatus may vary, and/or the like.

In an example embodiment, an apparatus receives energy from a charger. The apparatus may store at least part of the energy, for example in a battery.

In an example embodiment, the apparatus receives energy from a charger by way of a charging signal. The charging signal may relate to a non-periodic signal, such as a flat signal. The charging signal may relate to a periodic signal, such as a sinusoidal signal, a step signal, and/or the like. The charging signal may relate to a simple signal, such as a periodically varying signal, such as a sinusoidal signal, a step signal, and/or the like. The charging signal may relate to a non-simple signal, such as a modulated signal, for example an amplitude modulated signal, a frequency modulated signal, and/or the like. The charging signal may be an electrical signal, such as voltage, current, electrical field, and/or the like. The charging signal may be a magnetic signal, such as an inductive signal. The charging signal may an electro-magnetic signal, such as a radio frequency signal.

The apparatus may receive the charging signal by way of a connection between the charger and the apparatus. The connection may be a direct connection such as a wired connection, electrical contact connection, and/or the like. The connection may be an indirect connection, such as an inductive connection, a radio frequency connection, a capacitive connection, and/or the like. Absence of a connection and/or termination of a connection between the charger and the apparatus may be characterized as disconnection.

The charger may contact the apparatus or may not contact the apparatus. For example, an indirect connection charger may provide energy absent any contact between the charger and the apparatus. However, in another example, an indirect connection charger may provide energy when the charger and the apparatus are in contact with each other.

The charger may provide a mount for the apparatus or may not provide a mount for the apparatus. The mount may hold the apparatus, support the apparatus, position the apparatus, orient the apparatus, and/or the like, by utilizing mechanics, magnetics, and/or the like. For example, the charger may mechanically support the apparatus. In another example, the charger may magnetically hold the apparatus. In an example embodiment, a charger may provide a mount for an apparatus associated with a single apparatus orientation. For example, the charger may provide a mount for the apparatus in a portrait orientation. In another example, the charger may provide a mount for the apparatus in a landscape mode. In an example embodiment, a charger may provide a mount for an apparatus associated with a plurality of orientations. For example, the charger may provide a mount for the apparatus in a portrait orientation and for the apparatus in a landscape orientation. In another example, the charger may provide a mount for the apparatus in a landscape orientation and an orientation associated with a non-ninety-degree orientation, such as a tilted orientation, a slanted orientation, and/or the like.

The charger may be a apparatus other than a computer. For example, the charger may have no interface beyond its power source, such as an electrical outlet, and its connection to the apparatus. However, the charger may have interface elements beyond its power source and its connection to the apparatus.

FIG. 1A illustrates an apparatus 100 in relation to a charger 101. In the example of FIG. 1A, apparatus 100 is directly connected to charger 101. Charger 101 does not provide a mount for apparatus 100. Charger 101 may provide an electrical charging signal to apparatus 100.

Figure 1B:
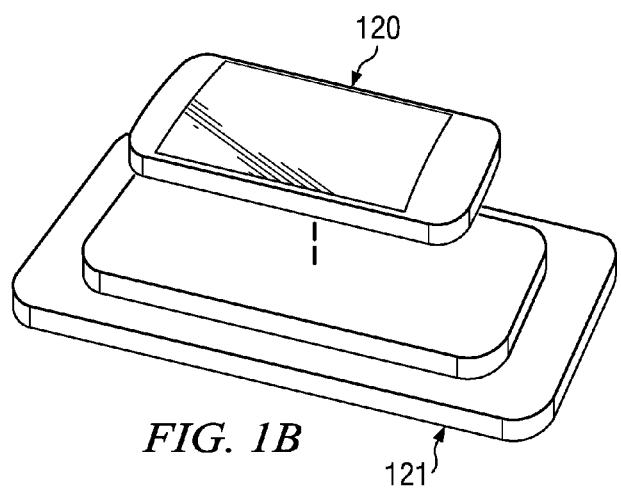

FIG. 1B illustrates an apparatus 120 in relation to a charger 121. In the example of FIG. 1B, apparatus 120 is not in contact with charger 121. Apparatus 120 may indirectly connect to charger 121. Charger 121 provides a magnetic mount for apparatus 120. Even though the example of FIG. 1B illustrates a flat orientation, the mount may relate to a single orientation or a plurality of orientations. Charger 121 may provide an electrical charging signal to apparatus 120, a magnetic charging signal to apparatus 120, an electromagnetic charging signal to apparatus 120, and/or the like.

Figure 1C:
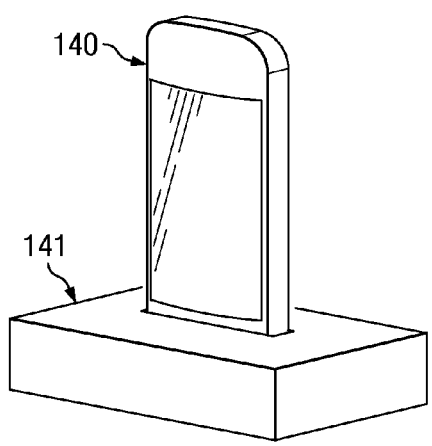

FIG. 1C illustrates an apparatus 140 in relation to a charger 141. In the example of FIG. 1C, apparatus 140 is in contact with charger 141. Apparatus 140 may directly and/or indirectly connect to charger 141. Charger 141 provides a mechanical mount for apparatus 140. Even though the example of FIG. 1C illustrates a portrait orientation, the mount may relate to a single orientation or a plurality of orientations. Charger 141 may provide an electrical charging signal to apparatus 140, a magnetic charging signal to apparatus 140, an electromagnetic charging signal to apparatus 140, and/or the like.

Figure 1D:
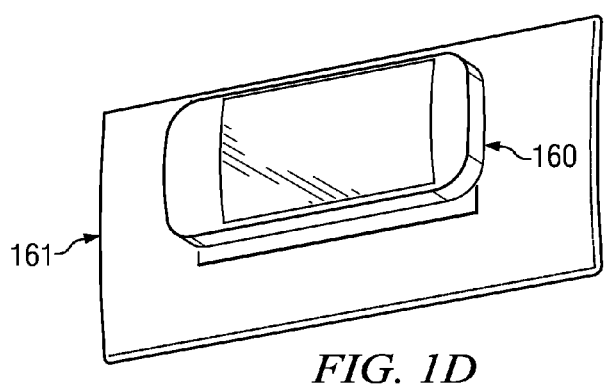

FIG. 1D illustrates an apparatus 160 in relation to a charger 161. In the example of FIG. 1D, apparatus 160 is in contact with charger 161. Apparatus 160 may directly and/or indirectly connect to charger 161. Charger 161 provides a mechanical mount, a magnetic mount, and/or the like, for apparatus 160. Even though the example of FIG. 1D illustrates a landscape orientation, the mount may relate to a single orientation or a plurality of orientations. Charger 161 may provide an electrical charging signal to apparatus 160, a magnetic charging signal to apparatus 160, an electromagnetic charging signal to apparatus 160, and/or the like.

Figure 2A:
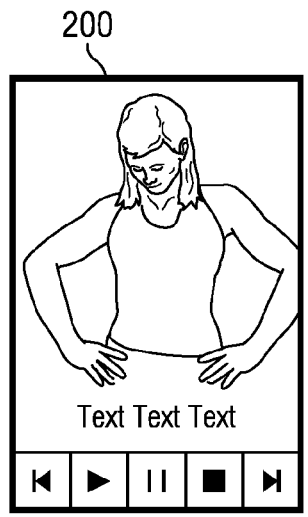
FIGS. 2A-2C are diagrams illustrating graphical representations associated with interaction modes according to at least one example embodiment.
Figure 2B:
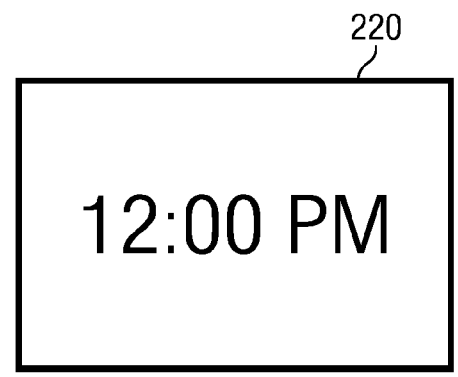
Figure 2C:
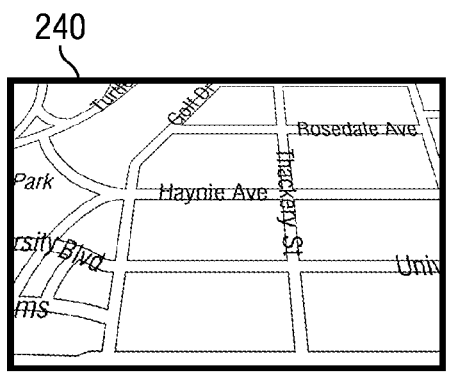

FIGS. 2A-2C are diagrams illustrating graphical representations associated with interaction modes according to at least one example embodiment. The examples of FIGS. 2A-2C are merely examples of graphical representation associated with interaction modes, and do not limit the scope of the claims. For example, graphical representation may vary with respect to content, size, color, and/or the like.

In an example embodiment, an interaction mode relates to the manner in which an apparatus interacts with at least one user, at least one other apparatus, and/or the like. For example, an interaction mode may relate to manner in which an apparatus interacts with a user, a network, a server, another apparatus, and/or the like.

In an example embodiment, interaction mode may relate to interaction absent regard for representation of charging information. For example, interaction mode may relate to interaction in addition to indication of charging information, and/or absent indication of charging information. In such an embodiment, interaction mode may be characterized as an interaction mode independent of representation of charging information. In an example embodiment, charging information relates to charging status, stored energy of an apparatus, and/or the like. For example, the apparatus may indicate charging status by causing a light to shine, flash, change color, and/or the like. In another example, the apparatus may indicate charging by causing display of an image, animation, and/or the like. FIGS. 2A-2C are diagrams illustrating graphical representations associated with interaction modes independent of representation of charging information, according to at least one example embodiment. Therefore, even though the examples of FIGS. 2A-2C do not illustrate indication of charging information, the apparatus may cause indication of charging information.

Interaction mode may relate to information provided to a user. For example, interaction mode may relate to content of the information provided to a user, such as text information, video information, image information, map information, audio information, and/or the like. In another example, interaction mode may relate to the manner in which information is caused to be displayed such as image size, font size, display orientation, volume, and/or the like. Interaction mode may relate to manner in which an apparatus provides indication of an event, such as an alarm, receiving a message, receiving a phone call, and/or the like. For example, interaction mode may relate to suppressing indication of an event, delaying indication of an event, suppressing a type of indication of an event, and/or the like. A type of indication of an event may relate to an audio indication, a visual indication, a tactile indication, a graphical indication, and/or the like.

Interaction mode may relate to at least one communication parameter. For example interaction mode may relate to enabling communication, a setting associated with communication, disabling communication, and/or the like. Communication may relate to wired communication and/or wireless communication. A communication parameter may relate to communication with a network, an apparatus, and/or the like. For example, a communication parameter may relate to a call setting, such as call forwarding, call blocking, voice mail, and/or the like. In another example, a communication parameter may relate to enabling a wireless network connection, a cellular network connection, a universal serial bus connection, a Bluetooth connection, and/or the like. In still another example, a communication parameter may relate to a setting associated with communication, such as an internet protocol address, a timeout value, firewall information, and/or the like.

In an example embodiment, a communication parameter relates to a social networking parameter. A social networking parameter may relate to presence information, availability information, privacy information, location information, account information, status information, and/or the like. The social networking information may relate to one or more accounts associated with the apparatus, the user, and/or the like.

FIG. 2A relates to a graphical representation 200 of a media player interaction mode. A media player interaction mode may relate to an interaction mode associated with playing audio, video, and/or the like.

FIG. 2B relates to a graphical representation 220 of a clock interaction mode. A clock interaction mode may relate to a graphical representation of time.

FIG. 2C relates to a graphical representation 240 of a map interaction mode. A map interaction mode may relate to map information, route information, position information, geographic direction information, and/or the like.

Figure 3:
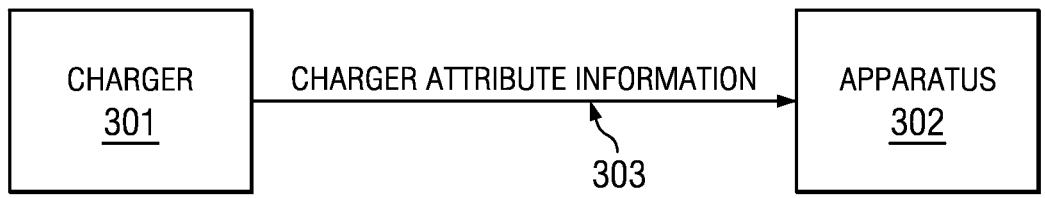
FIG. 3 is a diagram illustrating communication between a charger and an apparatus according to at least one example embodiment.

FIG. 3 is a diagram illustrating communication between a charger 301 and an apparatus 302 according to at least one example embodiment. The example of FIG. 3 is merely an example of communication between a charger and an apparatus, and does not limit the scope of the claims. For example, the apparatus may communicate to the charger, the charger may communicate information in addition to charger attribute information, and/or the like.

In an example embodiment, an apparatus receives charger attribute information 303 from a charger. Charger attribute information 303 may relate to charger type information, identification information, interaction mode information associated with the charger, location information, at least one environmental information, and/or the like. Identification information may relate to charger identification, charger type information, and/or the like. Charger identification information may relate to a unique identifier that the apparatus may associate with the charger. Charger type information may relate to media playing capability, video capability, a desktop charger type, a car charger type, and/or the like. Location information may relate to a nightstand, an office desk, a car dashboard, a car console, a treadmill control panel, and/or the like. Environmental information may relate to sound level around the charger, light level around the charger, and/or the like. Interaction mode information may relate to information associated with an interaction mode in which the apparatus operates when connected to the charger. For example, the apparatus may base its interaction mode, at least in part, on interaction mode information received from the charger.

In an example embodiment, the apparatus receives charger attribute information separately from the charging signal. For example, charger attribute information may be received electrically, magnetically, optically, electro-magnetically, and/or the like independently of the charging signal.

In an example embodiment, the apparatus receives charger attribute information as part of the charging signal. For example, the charging signal may have modulation corresponding to the charger attribute information. For example, the charging signal may be pulse code modulated, frequency modulated, amplitude modulated, and/or the like. In such an embodiment, the apparatus may demodulate the modulated charging signal to receive the charger attribute information.

Figure 4:
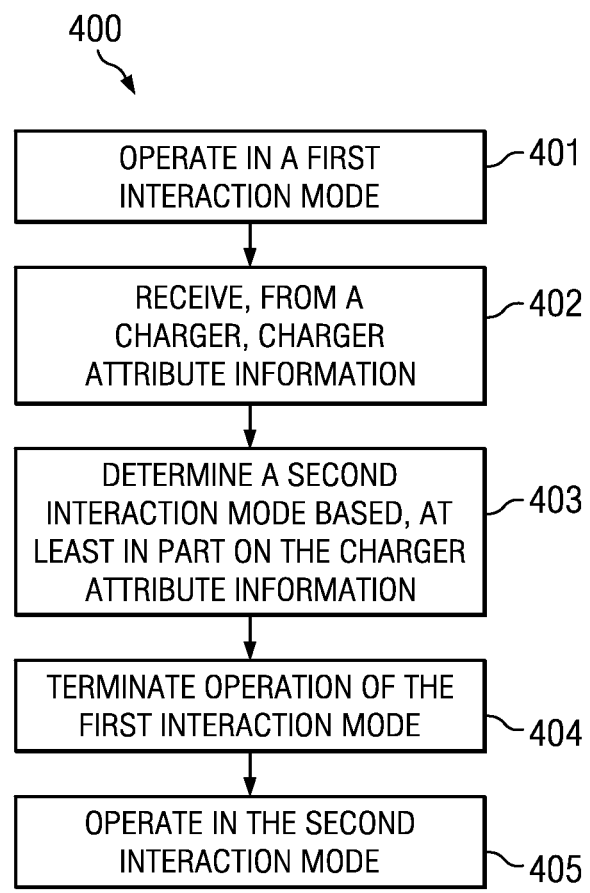
FIG. 4 is a flow diagram showing a set of operations 400 for determining interaction mode according to an example embodiment.
Figure 6:
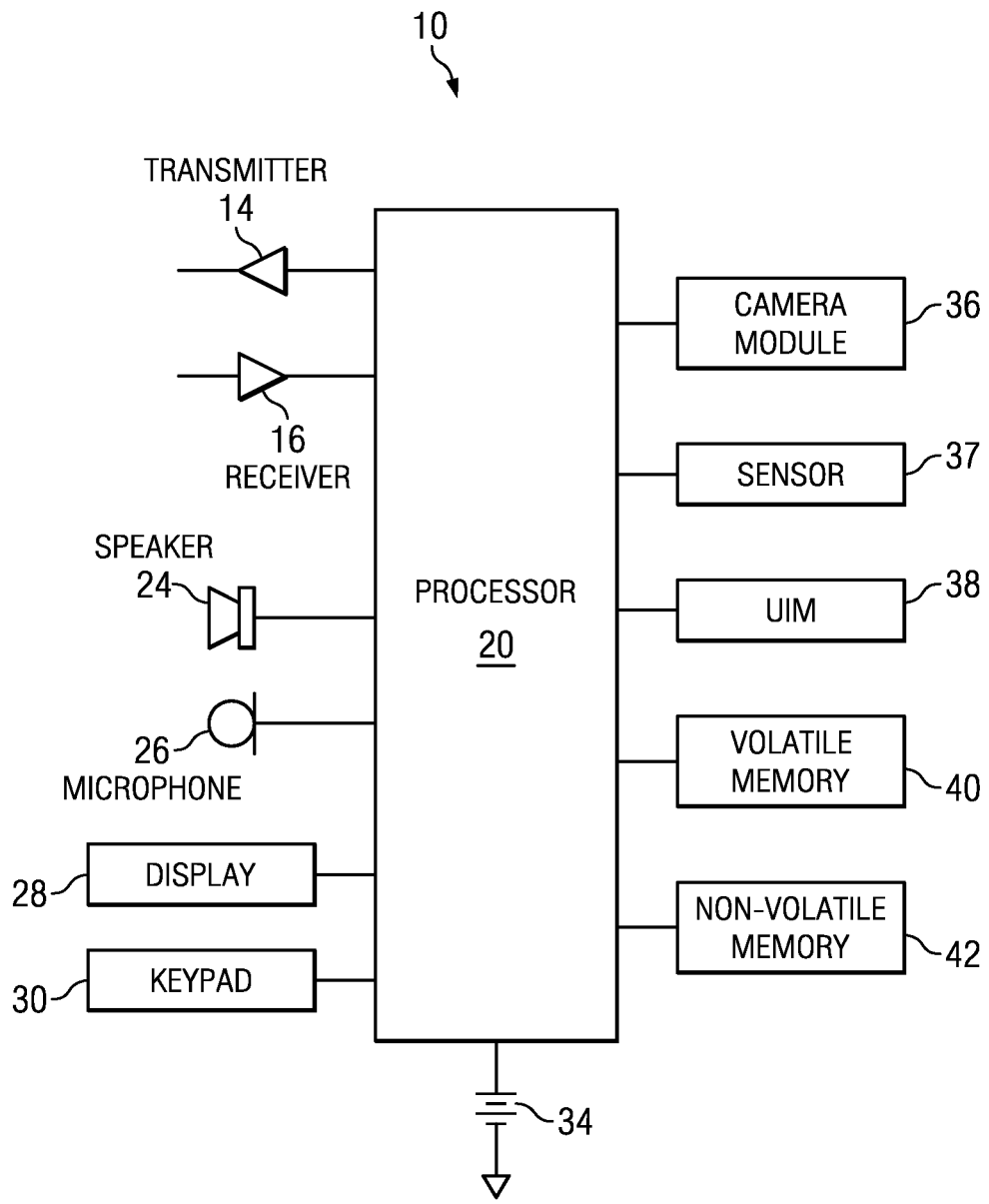
FIG. 6 is a block diagram showing an apparatus according to an example embodiment.

FIG. 4 is a flow diagram showing a set of operations 400 for determining interaction mode according to an example embodiment. An apparatus, for example electronic device 10 of FIG. 6 or a portion thereof, may utilize the set of operations 400. The apparatus may comprise means, including, for example processor 20 of FIG. 6, for performing the operations of FIG. 4. In an example embodiment, an apparatus, for example device 10 of FIG. 6, is transformed by having memory, for example memory 42 of FIG. 6, comprising computer code configured to, working with a processor, for example processor 20 of FIG. 6, cause the apparatus to perform set of operations 400.

At block 401, the apparatus operates in a first interaction mode. The interaction mode may be similar as described with reference to FIGS. 2A-2C.

At block 402, the apparatus receives, from a charger, charger attribute information. The charger may be similar as described with reference to FIGS. 1A-1D. The charger attribute information and receiving the charger attribute information may be similar as described with reference to FIG. 3.

At block 403, the apparatus determines a second interaction mode based, at least in part on the charger attribute information. The second interaction mode may differ from the first interaction mode. The interaction mode may be similar as described with reference to FIGS. 2A-2C.

In an example embodiment, the apparatus determines the second interaction mode based, at least in part on a setting associated with, at least a part of, the charger attribute information. For example, the apparatus may utilize a table that associates at least a part of the charger attribute information with a setting. In such an example, the determination of the second interaction mode may be based, at least in part, on as setting corresponding to the received charger attribute information in the table.

Determination of the second interaction mode may be based, at least in part, on user input associated with, at least part of, the charger attribute information. The apparatus may receive the user input at various times. For example, the apparatus may receive the user input upon receiving the charger attribute information. In such an example, the apparatus may query the user regarding interaction mode to be associated with the charger attribute information. In another example, the apparatus may receive the user input prior to receiving the charger attribute information.

Determination of the second interaction mode may be based, at least in part, on identifying a predetermined interaction mode that corresponds with the charger attribute information. Identifying may comprise utilizing a table, a database, a list, a calculation, and/or the like. The predetermined interaction mode may relate to one or more settings stored on the apparatus. In an example embodiment, an apparatus may receive charger attribute information comprising identification information. In such an embodiment, the apparatus may utilize a setting associated with the identification information to determine the second interaction mode. For example, the apparatus may utilize a setting associated with a media player interaction mode in response to receiving identification information that corresponds to the setting.

In an example embodiment, the apparatus may determine the second interaction mode based, at least in part, on an inherent association of, at least part of, the charger attribute information. For example, if the apparatus receives identification information relating to environmental information, the apparatus may determine the second interaction mode in accordance with the environmental information. For example, the environmental information may relate to a noisy area. In such an example, the apparatus may determine the second interaction mode to have a high audio volume. In another example, if the apparatus receives identification information relating to location information, the apparatus may determine the second interaction mode based, at least in part, on an inherent property of the position information. For example, if the location information relates to exercise equipment, such as a treadmill, the apparatus may determine the second interaction mode to have a large font based, at least in part, on an inherent property of exercise equipment that users are typically in motion, which may relate to difficulty reading small font. In still another example, if the apparatus receives identification information relating to charger type information, the apparatus may determine the second interaction mode based, at least in part, on an inherent property of the charger type information. For example, if the charger type information relates to a car charger type, the apparatus may determine the second interaction mode to disable text messaging, enable hand-free operation, and/or the like based, at least in part, on an inherent property associated with driving safety.

At block 404, the apparatus terminates operation of the first interaction mode. Terminating operation of the first interaction mode may relate to disabling the interaction mode, changing the interaction mode, substantially changing the interaction mode, and/or the like. The apparatus may terminate operation of the first interaction mode in response to determining the second interaction mode.

At block 405, the apparatus operates in the second interaction mode. The operation may be similar as described with reference to block 401. The apparatus may operate in the second interaction mode in response to termination of the first interaction mode, determination of the second interaction mode, and/or the like.

Figure 5:
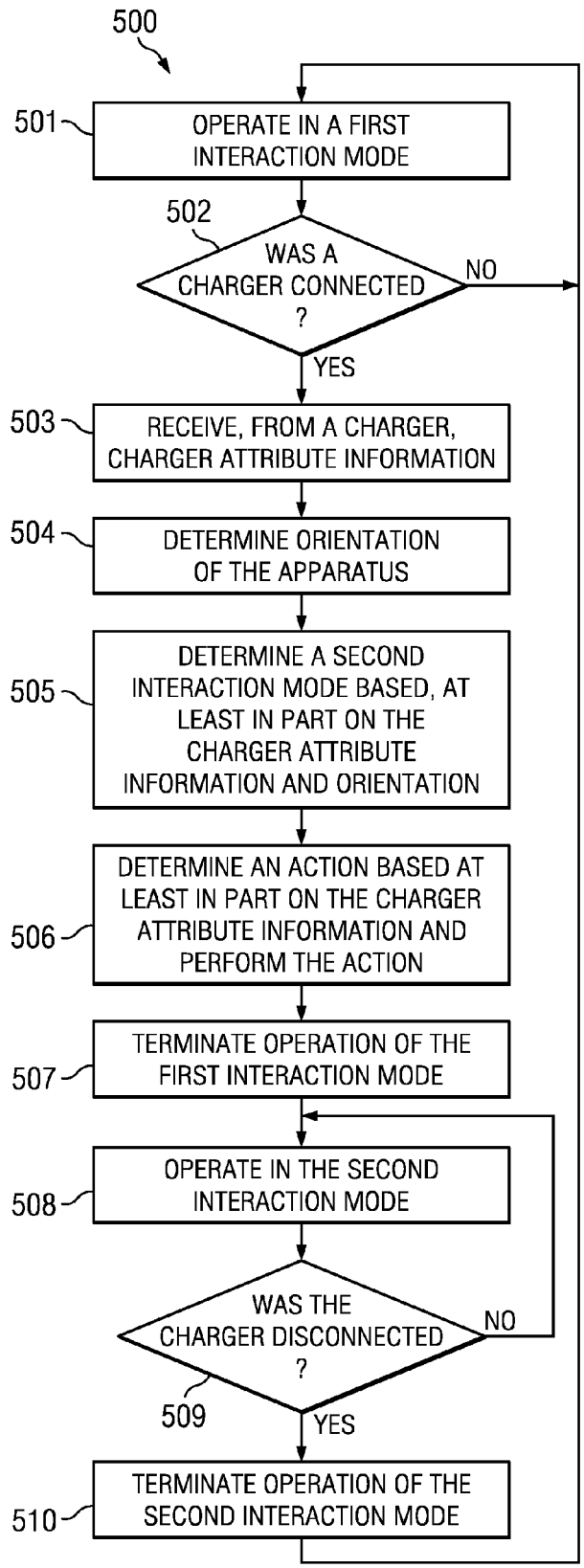
FIG. 5 is a flow diagram showing a set of operations for causing display of a cursor according to an example embodiment.

FIG. 5 is a flow diagram showing a set of operations 500 for causing display of a cursor according to an example embodiment. An apparatus, for example electronic device 10 of FIG. 6 or a portion thereof, may utilize the set of operations 500. The apparatus may comprise means, including, for example processor 20 of FIG. 6, for performing the operations of FIG. 5. In an example embodiment, an apparatus, for example device 10 of FIG. 6, is transformed by having memory, for example memory 42 of FIG. 6, comprising computer code configured to, working with a processor, for example processor 20 of FIG. 6, cause the apparatus to perform set of operations 500.

At block 501, the apparatus operates in a first interaction mode, similar as described with reference to block 401 of FIG. 4.

At block 502, the apparatus determines whether a charger is connected. The connection may be similar as described with reference to FIGS. 1A-1D. The apparatus may determine connection to the charger by detecting a charging signal, detecting contact between the charger and the apparatus, for example using a sensor, and/or the like. If the apparatus determines a connection to a charger, flow proceeds to block 503. Otherwise, flow proceeds to block 501.

At block 503, the apparatus receives from the charger, charger attribute information, similar as described with reference to block 402 of FIG. 4.

At block 504, the apparatus determines orientation of the apparatus. The orientation of the apparatus may be similar as described with reference to FIGS. 1A-1D. The apparatus may determine the orientation using a sensor, such as sensor 37 of FIG. 6.

At block 505, the apparatus determines a second interaction mode based, at least in part on the charger attribute information and the orientation. The second interaction mode may differ from the first interaction mode. The determination may be similar as described with reference to block 403 of FIG. 4.

At block 506, the apparatus determines an action based at least in part on the charger attribute information and performs the action. The action may relate to sending a message, connecting to a different apparatus, sending a signal, and/or the like. For example, the action may relate to updating social networking information. In such an example, the action may relate to notification of position, status, and/or the like, such as sending a message indicating sleeping when the apparatus determines a nightstand interaction mode. In another example, the action may relate to connecting to a wireless network, such as a cellular network. In still another example, the action may relate to connecting to a Bluetooth device. In still another example, the action may relate to streaming information to another apparatus, the charger, and/or the like. The action may be performed in response to determination of the second interaction mode.

At block 507, the apparatus terminates operation of the first interaction mode, similar as described with reference to block 404 of FIG. 4.

At block 508, the apparatus operates in the second interaction mode, similar as described with reference to block 405 of FIG. 4.

At block 509, the apparatus determines whether the charger has been disconnected. The disconnection may be similar as described with reference to FIGS. 1A-1D. The apparatus may determine disconnection from the charger by detecting absence of a charging signal, detecting a loss of physical connection between the charger and the apparatus, for example using a sensor, and/or the like. If the apparatus detects disconnection from the charger, flow proceeds to block 510. Otherwise, flow proceeds to block 508.

At block 510, the apparatus terminates the second interaction mode. The termination may be similar as described with reference to block 404 of FIG. 4. The apparatus may perform the termination in response to determining disconnection from the charger. In response to terminating the second interaction mode, the apparatus operates in the first interaction mode at block 501.

FIG. 6 is a block diagram showing an apparatus, such as an electronic device 10, according to an example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1-6. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1-6. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1-6. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. Display 28 may display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1-6. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Although FIG. 6 illustrates an example of an electronic device that may utilize embodiments of the invention including those described and depicted, for example, in FIGS. 1-6, electronic device 10 of FIG. 6 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 6. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 403 of FIG. 4 may be performed after block 404. In another example, block 503 of FIG. 5 may be performed after block 504. In still another example, block 507 of FIG. 5 may be performed before block 506. Furthermore, if desired, one or more of the above-described functions may be optional or may be combined. For example, blocks 504 and 506 of FIG. 5 may be optional and/or combined with block 505.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   a processor;
   memory including computer program code, the memory and the computer program code configured to, working with the processor, cause the apparatus to perform at least the following:
   operate in a first interaction mode;
   receive, from a charger, charger attribute information indicative of at least one of a nightstand interaction mode or a car interaction mode;
   determine that the apparatus is in a first orientation;
   determine a second interaction mode based, at least in part on the charger attribute information and the first orientation, the second interaction mode differing from the first interaction mode;
   terminate operation of the first interaction mode;
   operate in the second interaction mode;
   determine that the apparatus is in a second orientation;
   determine a third interaction mode based, at least in part on the charger attribute information and the second orientation, the third interaction mode differing from the second interaction mode, at least, by way of content of information provided to a user;
   terminate operation of the second interaction mode; and
   operate in the third interaction mode.

2. The apparatus of claim 1, wherein the charger attribute information comprises identification information, wherein determining at least one of the second interaction mode or the third interaction mode is further based, at least in part, on the identification information.

3. The apparatus of claim 2, wherein the identification information relates to charger identification and determining at least one of the second interaction mode or the third interaction mode is further based, at least in part, on the charger identification.

4. The apparatus of claim 2, wherein the identification information relates to environmental information and determining at least one of the second interaction mode or the third interaction mode is further based, at least in part, on the environmental information.

5. The apparatus of claim 2, wherein the identification information relates to location information and determining at least one of the second interaction mode or the third interaction mode is further based, at least in part, on the location information.

6. The apparatus of claim 1, wherein the charger attribute information comprises charger type information, wherein determining at least one of the second interaction mode or the third interaction mode is further based, at least in part, on the charger type information.

7. The apparatus of claim 1, wherein determining at least one of the second interaction mode or the third interaction mode is based, at least in part, on identifying a predetermined interaction mode that corresponds with the charger attribute information.

8. The apparatus of claim 1, wherein determining at least one of the second interaction mode or the third interaction mode comprises determining font size.

9. The apparatus of claim 1, wherein determining at least one of the second interaction mode or the third interaction mode comprises determining at least one communication parameter.

10. The apparatus of claim 9, wherein the at least one communication parameter comprises at least one call parameter.

11. The apparatus of claim 9, wherein the at least one communication parameter comprises at least one social networking parameter.

12. The apparatus of claim 1, wherein the memory and the computer program code are further configured to, working with the processor, cause the apparatus to further perform determining a connection to the charger.

13. The apparatus of claim 1, wherein the charger attribute information is received as part of a charging signal.

14. The apparatus of claim 13, wherein the charging signal relates to a magnetic signal.

15. The apparatus of claim 13, wherein the charging signal relates to an electrical signal.

16. The apparatus of claim 13, wherein receiving the charger attribute information comprises demodulating the charging signal.

17. The apparatus of claim 1, wherein the memory and the computer program code are further configured to, working with the processor, cause the apparatus to further perform determining an action based at least in part on the charger attribute information and performing the action.

18. The apparatus of claim 1, wherein the memory and the computer program code are further configured to, working with the processor, cause the apparatus to further perform determining a disconnection from the charger and terminating at least one of the second interaction mode or the third interaction mode based on the disconnection.

19. The apparatus of claim 1, wherein the memory and the computer program code are further configured to, working with the processor, cause the apparatus to further perform operating in the first interaction mode in response to terminating at least one of the second interaction mode or the third interaction mode.

20. The apparatus of claim 1, wherein at least one of the second interaction mode or the third interaction mode is independent of representation of charging information.

21. The apparatus of claim 1, wherein the charger attribute information is indicative of the nightstand interaction mode, the first orientation relates to a landscape orientation, the second interaction mode relates to a clock interaction mode, the second orientation relates to a portrait orientation, and the third interaction mode relates to a phone interaction mode.

22. The apparatus of claim 1, wherein the charger attribute information is indicative of the car interaction mode, the first orientation relates to a landscape orientation, the second interaction mode relates to a map interaction mode, the second orientation relates to a portrait orientation, and the third interaction mode relates to a media player interaction mode.

23. A method, comprising:
operating in a first interaction mode;
receiving, from a charger, charger attribute information indicative of at least one of a nightstand interaction mode or a car interaction mode;
determining that the apparatus is in a first orientation;
determining a second interaction mode based, at least in part on the charger attribute information and the first orientation, the second interaction mode differing from the first interaction mode;
terminating operation of the first interaction mode;
operating in the second interaction mode;
determining that the apparatus is in a second orientation;
determining a third interaction mode based, at least in part on the charger attribute information and the second orientation, the third interaction mode differing from the second interaction mode, at least, by way of content of information provided to a user;
terminating operation of the second interaction mode; and
operating in the third interaction mode.

24. A non-transitory computer-readable medium encoded with instructions that, when executed by a computer, perform:
operating in a first interaction mode;
receiving, from a charger, charger attribute information indicative of at least one of a nightstand interaction mode or a car interaction mode;
determining that the apparatus is in a first orientation;
determining a second interaction mode based, at least in part on the charger attribute information and the first orientation, the second interaction mode differing from the first interaction mode;
terminating operation of the first interaction mode;
operating in the second interaction mode;
determining that the apparatus is in a second orientation;
determining a third interaction mode based, at least in part on the charger attribute information and the second orientation, the third interaction mode differing from the second interaction mode, at least, by way of content of information provided to a user;
terminating operation of the second interaction mode; and
operating in the third interaction mode.

* * * * *